(12) United States Patent
De Benedittis et al.

(10) Patent No.: US 8,655,354 B2
(45) Date of Patent: Feb. 18, 2014

(54) HANDLING CLOSED SUBSCRIBER GROUP LISTS

(75) Inventors: Rossella De Benedittis, Ulm (DE); Angelo Centonza, Winchester (GB); Srinivasan Selvaganapathy, Karanataka (IN)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/537,292

(22) Filed: Jun. 29, 2012

(65) Prior Publication Data

US 2013/0005328 A1    Jan. 3, 2013

Related U.S. Application Data

(60) Provisional application No. 61/502,990, filed on Jun. 30, 2011.

(51) Int. Cl.
*H04W 4/00* (2009.01)

(52) U.S. Cl.
USPC .................. 455/432.3; 370/328; 370/338

(58) Field of Classification Search
USPC .......... 455/422.1, 432.1, 432.2, 432.3, 434, 455/435.1, 435.2, 435.3; 370/328, 338
See application file for complete search history.

(56) References Cited

U.S. PATENT DOCUMENTS

| | | | |
|---|---|---|---|
| 7,194,264 B2 * | 3/2007 | Li et al. ...................... | 455/432.1 |
| 8,243,682 B2 * | 8/2012 | Nylander et al. ............. | 370/331 |
| 2002/0039892 A1 * | 4/2002 | Lindell ....................... | 455/151.1 |
| 2005/0101323 A1 * | 5/2005 | De Beer ....................... | 455/435.2 |
| 2008/0280620 A1 * | 11/2008 | Chin et al. .................... | 455/446 |
| 2009/0047960 A1 | 2/2009 | Gunnarsson et al. .......... | 455/436 |
| 2009/0080381 A1 * | 3/2009 | Yashar et al. ................. | 370/331 |
| 2009/0094680 A1 * | 4/2009 | Gupta et al. ...................... | 726/3 |
| 2010/0069069 A1 | 3/2010 | Lee et al. .................... | 455/435.2 |
| 2010/0075635 A1 | 3/2010 | Lim et al. ....................... | 455/411 |

(Continued)

FOREIGN PATENT DOCUMENTS

WO    WO-2009/022976 A1    2/2009
WO    WO-2009/149431 A1    12/2009

(Continued)

OTHER PUBLICATIONS

"Access control for inbound handover", CATT, 3GPP TSG-RAN WG3 #65, R3-091552, Aug. 2009, 2 pgs.

(Continued)

*Primary Examiner* — Christopher M Brandt
(74) *Attorney, Agent, or Firm* — Harrington & Smith

(57) ABSTRACT

A core network receives in an uplink message a first list of closed subscriber groups (CSGs) located within one gateway domain to which mobility is possible for a user equipment UE. The core network creates a third list by checking the first list received in the uplink message against a second list which is the UE's allowed CSG list, and sends the third list downlink to at least one of a serving gateway of the UE or a serving access node of the UE. In one embodiment the first list consists of all CSGs within a domain of the respective serving gateway/access node; and in another embodiment it consists of all neighbor closed subscriber group cells of the respective serving gateway/access node which sent the uplink message to the core network. In different embodiments the third list is a whitelist or a blacklist.

20 Claims, 4 Drawing Sheets

(56) References Cited

U.S. PATENT DOCUMENTS

| | | | | |
|---|---|---|---|---|
| 2010/0157943 | A1 | 6/2010 | Horn | 370/331 |
| 2010/0161794 | A1 | 6/2010 | Horn | 709/224 |
| 2011/0111745 | A1 | 5/2011 | Li et al. | 455/422.1 |
| 2012/0020295 | A1* | 1/2012 | Tiwari | 370/328 |
| 2012/0076018 | A1* | 3/2012 | Singh et al. | 370/252 |
| 2012/0083273 | A1* | 4/2012 | Mukherjee et al. | 455/436 |

FOREIGN PATENT DOCUMENTS

| | | |
|---|---|---|
| WO | WO-2010/059122 A2 | 5/2010 |
| WO | WO-2010/110519 A1 | 9/2010 |
| WO | WO-2011/013178 A1 | 2/2011 |

OTHER PUBLICATIONS

"$3^{rd}$ Generation Partnership Project; Technical Specification Group Radio Access Network; Evolved Universal Terrestrial Access Network" (E-UTRAN); S1 Application Protocol (S1AP) (Release 8), 3GPP TS 36.413 V0.1.0, Jun. 2007, 33 pgs.

$3^{rd}$ Generation Partnership Project; Technical Specification Group Radio Access Network; UTRAN Iu interface Radio Access Network Application Part (RANAP) signalling (Release 10), 3GPP TS 24.413 V10.1.0, Mar. 2011, 425 pgs.

$3^{rd}$ Generation Partnership Project; Technical Specification Group Services and System Aspects; Architecture aspects of Home NodeB and Home eNodeB (Release 9), 3GPP TR 23.830 V9.0.0, Sep. 2009, 55 pgs.

$3^{rd}$ Generation Partnership Project; Technical Specification Group Services and System Aspects; General Packet Radio Service (GPRS) enhancements for Evolved Universal Terrestrial Radio Access Network (E-UTRAN) Access (Release 10), 3GPP TS 23.401 V10.3.0, Mar. 2011, 278 pgs.

$3^{rd}$ Generation Partnership Project; Technical Specification Group Radio Access Network; Evolved Universal Terrestrial Radio Access Network (E-UTRAN); S1 Application Protocol (S1AP) (Release 10), 3GPP TS 36.413 V10.1.0, Mar. 2011, 256 pgs.

Golaup, Assen, et al.; "Femtocell Access Control Strategy in UMTS and LTE"; IEEE Communications Magazine; Sep. 2009; pp. 117-123.

* cited by examiner

HANDLING CLOSED SUBSCRIBER GROUP LISTS

CROSS REFERENCE TO A RELATED APPLICATION

This patent application claims priority under 35 USC 119(e) from provisional U.S. Patent Application No. 61/502,990, filed on Jun. 30, 2011. That provisional application is hereby incorporated by reference in its entirety.

TECHNICAL FIELD

The exemplary and non-limiting embodiments of this invention relate generally to wireless communication systems, methods, devices and computer programs and, more specifically, relate to the handling of user equipment closed subscriber group lists among core networks and femto/home networks such as home NodeB networks in UMTS and home eNodeB networks in LTE.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
   ACK acknowledgment
   CN core network
   CSG closed subscriber group
   eNB evolved NodeB, EUTRAN network access node
   EPC evolved packet core
   EUTRAN evolved UTRAN (LTE)
   GW gateway
   HeNB home eNB
   HNB home NodeB
   HO handover
   ID identity
   IMSI international mobile subscriber identity
   LTE long term evolution (EUTRAN)
   MAC medium access control
   MM/MME mobility management/mobility management entity
   NB NodeB, UTRAN network access node
   RAN radio access network
   RANAP radio access network application part
   RRC radio resource control
   S-GW serving gateway
   SRNS serving radio network subsystem
   UE user equipment
   UMTS universal mobile telecommunication system
   UTRAN universal terrestrial radio access network Both the UTRAN/UMTS and the EUTRAN/LTE system include deployments of what are generically termed femto nodes. In UTRAN (3G) these are termed HNBs and in LTE (4G) these are termed HeNBs. Apart from possibly allowing emergency calls, typically these femto nodes offer wireless voice and data service to only certain authorized UEs which are the members or subscribers, referred to as the node's/cell's CSG. More generally the femto nodes privilege their subscribers and authorized guests for some wireless service as compared to non-subscribers. Some femto cells are arranged contiguously as a group such as across a university or corporate campus that serves a single subscriber list, and so femto networks are referred to as CSG networks whether or not they operate solo or as part of such a group. UE's also have stored in their local memory a CSG list which identifies all those CSG networks to which the UE is authorized access.

In UTRAN it is mandatory that there is a HNB GW supporting the femto deployments; this HNB lies functionally between the CN and the HNBs. In LTE the HeNBs may be connected to a HeNB GW similar to UTRAN or they may be directly connected to CN. FIG. 1 illustrates an LTE deployment with a HeNB GW, in which the CN is represented as the MME/S-GW. The 3G arrangement is similar but with the 3G network controller in place of the MME/S-GW.

While femto nodes are often characterized as restricting access to non-subscribers, in fact they can operate in other modes besides that closed access mode. In the hybrid access mode the HNB/HeNB operates as a CSG cell where at the same time non-CSG members are allowed access, and in the open access mode the HNB/HeNB operates as a normal cell (i.e. a non-CSG cell). Additionally, in 3G there is the possibility of having non-CSG capable UEs, namely legacy UEs which do not have the capability to support certain CSG-specific functionalities. The 3G system currently allows access control for such UEs in cell access or mobility scenarios at the HNB GW, but this is the exception to typical practice and in the description below it is assumed that the described UE is CSG-capable.

Current mobility scenarios involving CSG-capable UEs and LTE HeNBs or 3G HNBs are based on the assumption that the core network will perform access control aimed at verifying whether the UE is a member of the CSG supported by the target cell. The results of such access control can be the success or failure of the mobility procedure when a UE is moving towards CSG closed cells, and in a less severe case can result in improperly prioritizing or de-prioritizing a UE in a target cell for the case the UE is moving toward hybrid cells.

Consider the two mobility scenarios shown at FIG. 1, which reflect the LTE system but are equally valid for the UTRAN system also. In a first case the UE is moving from HeNB#1 to HeNB#2 both served by the same HeNB GW and the mobility signaling messages flow is shown as intra GW mobility signaling. In a second case the UE is moving from HeNB#2 served by the HeNB GW to (macro) eNB#1 served by a MME/S-GW and the mobility signaling messages flow is shown as inter GW mobility signaling. In each of these for both LTE and UTRAN access control will not be possible because the mobility signaling messages do not cross any node which has possession of the subscriber information for the UE, which would allow for access control to be carried out.

The UE's subscription information is termed an "Allowed CSG List", which conventionally is passed to the HNB GW in cases when the UE is paged within the home cell. Therefore if the HNB/HeNB GW could obtain the UE's allowed CSG list via paging, access control would be possible whenever the UE sets up signaling connections in response to being paged. The problem with this extension is that there is no mechanism to ensure that this information is sent to the HNB/HeNB GW for the case in which paging has not occurred in the cell but the UE needs to be involved in an enhanced mobility procedure for one of the scenarios shown at FIG. 1. Additionally there is no mechanism to update UE's allowed CSG list at the HNB/HeNB GW once it changes.

In scenarios where the HNB/HeNB itself carries out access control during the mobility scenarios shown in FIG. 1, the HNB/HeNB should have the CSG-Subscription status of UE in the possible target cells for which mobility is possible. The relevant information in the UE's allowed CSG list needs to be communicated to the serving cell and to the potential target cells where such cells are an HNB/HeNB cell in order to allow for access control.

Document R3-091552 by CATT entitled "Access control for inbound handover" (3GPP TSG-RAN WG3 #65; Shenzen, China; 24-28 Aug. 2009) suggests including the allowed CSG list in the UE CONTEXT SETUP REQUEST message for the purpose of allowing the serving eNB to perform access control instead of the CN while the handover procedures were still carried out via the CN. Similarly this document also mentions including the allowed CSG List in the HANDOVER REQUIRED message to allow the HNB GW to carry out access control when the mobility procedures are still carried out via the CN.

As stated at page 1 of document R3-091552, the problem it addresses is how to perform access control for macro to femto mobility procedures via the core network, which is a different from the mobility shown at FIG. 1. For this reason document R3-091552 gives no reason to include the allowed CSG list in any other messages since it always foresees core network involvement during a UE relocation. Moreover, document R3-091552 entails informing the complete CSG-List of the UE.

The exemplary embodiments detailed below are directed to a different purpose, the exchange of the CSG subscription information needed for the nodes such as the HNB/HeNB GW or the HNB/HeNB for the purpose of permitting mobility procedures to avoid routing via the core network. Certain exemplary embodiments further support mobility scenarios which utilize soft-handoffs, where the radio resources for the UE being handed over are allocated to the target access node (HNB/HeNB) based on the UE's CSG subscription.

SUMMARY

According to a first aspect of the invention there is a method comprising: receiving in an uplink message a first list of closed subscriber groups located within one gateway domain to which mobility is possible for a user equipment; creating a third list by checking the first list received in the uplink message against a second list which is the user equipment's allowed closed subscriber group list; and sending the third list downlink to at least one of a serving gateway of the user equipment or a serving access node of the user equipment.

According to a second aspect of the invention there is an apparatus comprising at least one processor and at least one memory storing computer program code. In this aspect the at least one memory with the computer program code is configured with the at least one processor to cause the apparatus to perform actions comprising: receiving in an uplink message a first list of closed subscriber groups located within one gateway domain to which mobility is possible for a user equipment; creating a third list by checking the first list received in the uplink message against a second list which is the user equipment's allowed closed subscriber group list; and sending the third list downlink to at least one of a serving gateway of the user equipment or a serving access node of the user equipment.

According to a third aspect of the invention there is a memory storing computer program code. When such computer program code is executed by at least one processor, the resulting actions comprise: receiving in an uplink message a first list of closed subscriber groups located within one gateway domain to which mobility is possible for a user equipment; creating a third list by checking the first list received in the uplink message against a second list which is the user equipment's allowed closed subscriber group list; and sending the third list downlink to at least one of a serving gateway of the user equipment or a serving access node of the user equipment.

DETAILED DESCRIPTION

Below are separately detailed exemplary embodiments of the invention as implemented in the UTRAN and in the LTE radio access systems given the different procedures already standardized for those systems. The end result is to communicate the relevant information from the UE's allowed CSG list to those HNB/HeNB GWs and HNBs/HeNBs which might need it for UE mobility. For improved efficiency some exemplary embodiments detailed below do not communicate the entire UE allowed CSG list but one more tailored for the general proximity of the UE since many of the groups in the full allowed CSG list will not include any cells in the UE's current vicinity.

Figure 1:
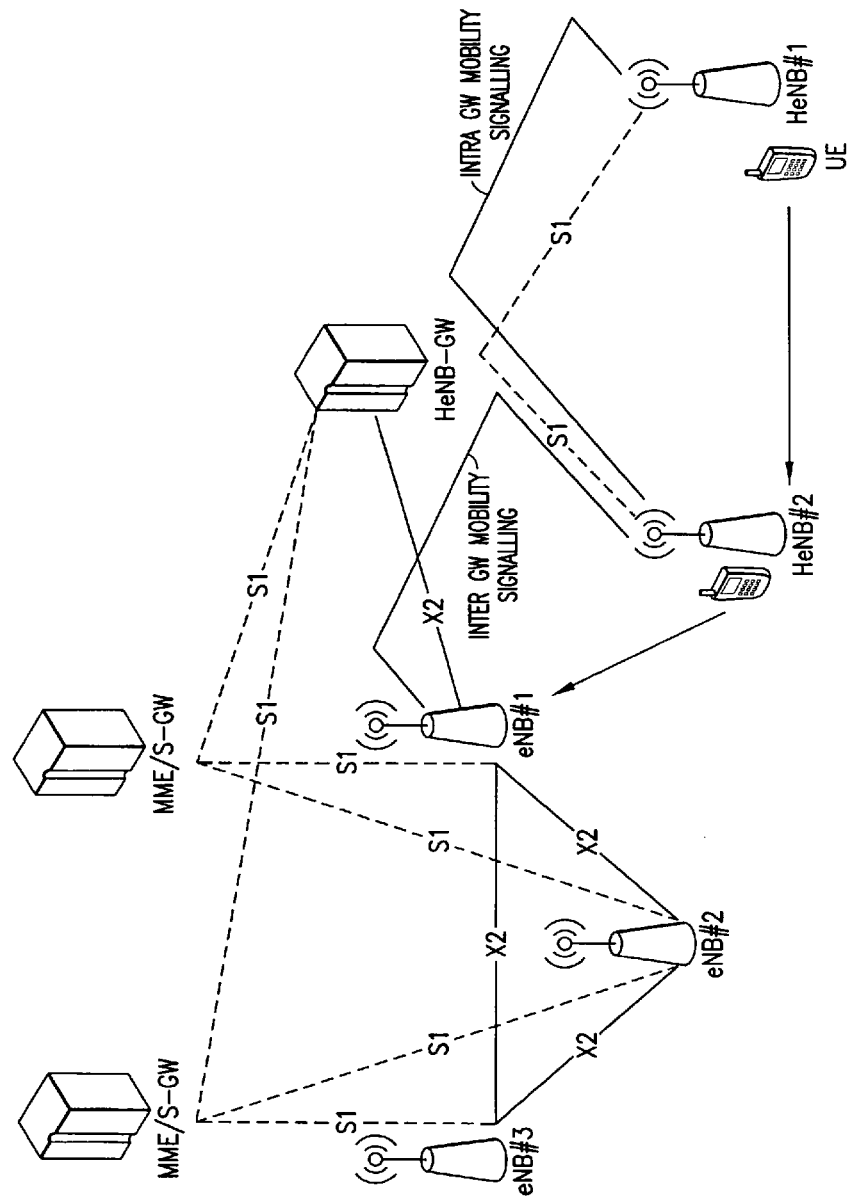
FIG. 1 is a schematic drawing showing an EUTRAN macro network with eNBs, a femto network with HeNBs, and a UE moving among them in various mobility scenarios relevant to the exemplary embodiments of the invention detailed herein.
Figure 2:
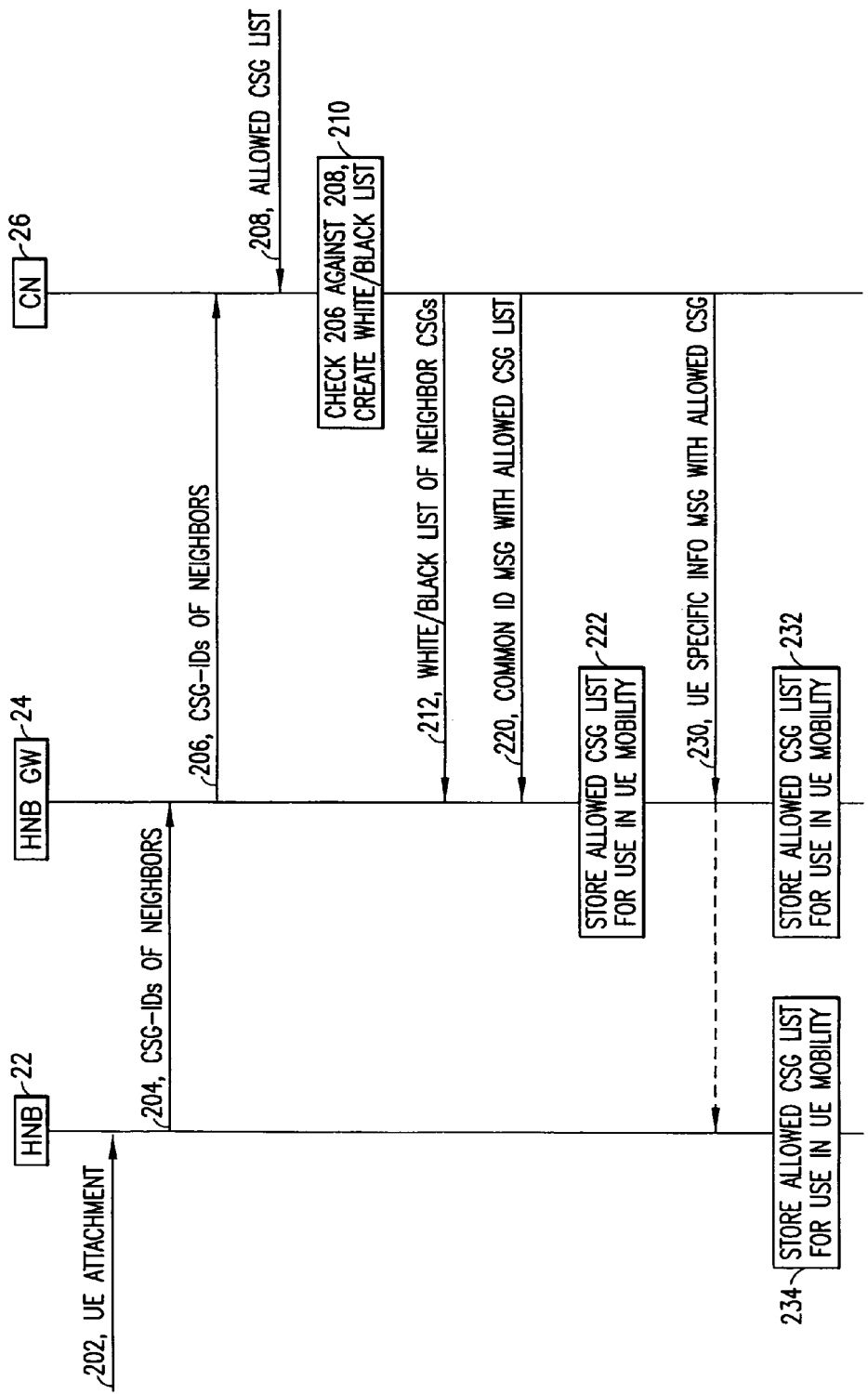
FIG. 2 is a signaling diagram showing various exemplary implementations of these teachings in a UTRAN system.

FIG. 2 is a signaling diagram illustrating various exemplary UTRAN implementations of this invention for getting the required CSG-Subscription info to the HNB GW 24 and also possibly the HNB 22. When a UE attaches at block 202 to a HNB 22 (when the signaling connection is setup in the CSG Cell 22), the HNB 22 sends to the HNB GW 24 a message 204 which identifies the CSG cells to which mobility is possible for this UE. Note that the CSG cells of message 204 are independent of the UE's allowed CSG list; they are only those cells which are neighbor cells to the HNB 22 to which the UE is attached, which are also CSG cells, and which are technology-compatible with the UE (e.g., a neighbor CSG operating only according to LTE protocols would not be identified as a possible handover candidate for a UE which is not capable of operating in the LTE system). For brevity we can term this a CSG mobility list. Note also that sending this message 204 is not triggered by any impending mobility of the UE to another cell. Whereas other solutions noted in the background section above keep the CN in control of UE mobility for macro to femto node mobility, as will be seen for FIG. 2 the CN 26 provides the correct CSG mobility information to the HNB GW 24 but not in conjunction with any handover procedure. In the UTRAN system the CN 26 is represented by a radio network controller RNC.

For the case in which the HNB 22 originated the signaling connections with the UE, message 204 may be an INITIAL UE MESSAGE. In an embodiment the CSG cells are identified in the INITIAL UE MESSAGE by their CSG-IDs, and optionally also by their Cell-ID. In a different embodiment the CSG cells identified in the INITIAL UE MESSAGE are all those cells present in the domain of the HNB GW 24 which are CSG cells. In that respect the domain is all HNBs supported by the same NHB GW 24. In some femto network deployments there is a grouping of HNBs by enterprise, and so an embodiment appropriate for such cases is that the INITIAL UE MESSAGE has a list of all those CSG IDs deployed in the same enterprise (i.e. CSG IDs supported by all HNBs in the same enterprise.

The HNB GW 24 then forwards this message to the core network CN 26 at message 206, or at least it forwards the CSG mobility list. The CN 28 obtains the UE's full allowed CSG list at 208 (from the UE's home network if the UE is visiting in the network of the HNB GW 24), and at 210 the CN 26 checks the CSG mobility list received in message 206 against the allowed CSG list received at message 208 to find whether there are any in the CSG mobility list that the UE cannot enter. Those will be disqualifies as handover target candidates for this UE. Block 210 notes that the CN 26 creates a whitelist or blacklist; the whitelist is an implementation in which the CN 26 reports out the listing of CSG cells which are possible handover target candidates and the blacklist is an implementation where the CN 26 reports out the listing of CSG cells which are not handover target candidates for this UE. The whitelist identifies those CSGs in the UE's vicinity which the UE can access and the blacklist identifies those CSGs in the UE's vicinity which the UE cannot. The CN 26 will send this CSG whitelist or CSG blacklist in a downlink message 212 to the HNB GW 24. In an embodiment message 212 which carries the SCG whitelist or blacklist is a COMMON ID message.

For the case where the signaling connections of the UE attachment at block 202 are created through inbound mobility where the UE is handed over from some other cell, message 204 and 206 may be implemented as the RELOCATION-REQUEST-ACK message.

For enhanced mobility scenarios, in an embodiment the HNB 22 shall inform the new CSG mobility list of message 204 to the HNB GW 24 through the final message of the enhanced relocation procedure to HNB-GW 24, which is termed the Enhanced Relocation Complete Request. In this case the HNB-GW 24 can send this information to the CN 26 at message 206 which may be implemented as new kind of RANAP message such as might be termed a UE-CSG-MOBILITY-INFORMATION message, or as an existing message such as for example an Enhanced Relocation Complete Request message which the HNB GW 24 can forward to the CN 26. The UE-CSG-MOBILITY-INFO message from the HNB 22 includes a list of the CSG IDs and optionally also their Cell Identities corresponding to the possible handover target cells of the serving HNB 22 cell. Alternatively the HNB GW 24 can implement message 206 which includes this new CSG mobility list as a Location Report message, but in this case preferably the Location Report message also includes the new Serving CSG-ID (of the NHB 22).

Then the reply message 212 from the CN 26 which includes the list of allowed or not allowed CSG IDs can be implemented in one of several ways: as an existing enhanced relocation message such as for example the Enhanced Relocation Complete Response; as a new kind of RANAP message; or as the COMMON ID message.

For the case of SRNS relocation scenarios via Iurh interfaces between HNBs, the target HNB shall update the allowed CSG list to the CN 26 via the first uplink direct transfer message to the CN 26.

It arises sometimes that the UE's Allowed CSG List is changed or updated. In this case the CN 26 will get the updated list from the UE's home network (if the UE is operating in a visiting network) and below are several options by which the CN 26 can get the updated information to the HNB GW 24. Since in UTRAN the UE mobility is handled by the HNB GW 24 it is not always necessary to send this updated information to the HNB 22 but in certain embodiments the HNB GW 24 can notify the HNB 22 of the updated subscription information. A given UTRAN system can use only one or more than one of these approaches.

The COMMON ID message is conventionally generated after the UE has requested a radio bearer. The COMMON ID message is already intercepted by the HNB GW 24 in order to verify the UE identity (the UE's IMSI). In an embodiment of the invention the UE's full Allowed CSG List is included in this message 220 from the CN 26 to the HNB GW 24. The HNB GW 24 then stores it at block 222 and uses it for access control in following mobility procedures between two HNBs or between an HNB and a NB. Equivalently, the Allowed CSG List could be stored at the HNB 22 and used for the same access control purposes.

One option to get updated subscription information to the HNB GW 24 is then that same COMMON ID message 220 sent by the CN 26, but for updated CSG subscriber information the CN 26 sends it whenever there is a change in the subscription information that is relevant to the CSG Mobility List which the CN 26 received at message 206. In this case the message containing an up-to-date Allowed CSG List will be re-sent and the out of date information stored at the HNB GW 24 and/or the HNB 22 will be replaced.

Another option to get updated subscription information to the HNB GW 24 is via a UE SPECIFIC INFORMATION message 230. The CN 26 can generate this message at any time after the UE connects to the cell 22, regardless of whether the Allowed CSG List is updated or not. This message can be used to transport the Allowed CSG List from the CN 26 to the HNB GW 24 and/or to the HNB 22 which store it at respective blocks 232 and 234. This same type of message 230 can then be used also to maintain the Allowed CSG List via subsequent re-transmissions.

For the case in which message 204 is implemented as a UE-CSG-MOBILITY-INFORMATION or UE-CSG-MOBILITY-INFO-REQUEST message, then message 230 from the CN 26 for providing updated CSG subscription information may be implemented as a UE-CSG-MOBILITY-INFO-UPDATE message. Rather than the full Allowed CSG List, such an INFO-UPDATE message will include an updated list of allowed CSGs that are within the HNB's CSG-Mobility List of message 206 (or a replacement to the whole list). The CN 26 will use this message 230 to list which CSGs, among the ones reported previously to the CN 26 by the HNB GW 24 (via message 206 implemented as the UE-CSG-MOBILITY-INFORMATION or UE-CSG-MOBILITY-INFO-REQUEST message) are either not suitable as UE target candidates or are suitable as UE handover candidates.

For the LTE radio access system consider again FIG. 2, but with elements 22, 24 and 26 representing the respective HeNB, HeNB GW and MME. Signaling is similar to inform the HeNB 22 and the HeNB GW 24 the list of CSGs supported by potential handover candidate CSG cells but with different implementations of the messages.

For LTE message 204 may be implemented as a S1-SETUP-REQUEST message, used by the HeNB for exchanging application level data with the MME. Conventionally this message already allows the possibility of listing a number of supported CSG IDs. But according to these teachings it is forwarded (or the list is) by the HeNB GW 24 to the MME 26, and the CSG IDs it includes are those belonging to neighbor CSG cells of the HeNB 22 (and in an optional embodiment also the Cell Global Identities) of cells that are potential handover candidates for the UE. The S1-CONFIGURATION UPDATE message can be used for updating the list of supported CSG IDs. Alternatively, message 204 may be implemented as a S1-INITIAL UE message, used by the HeNB for transferring the first UE message to the MME.

The whitelist/blacklist is created by the MME 26 similarly as described above for the CN in the UTRAN system, and may be a subset of the UE's Allowed CSG list, more particularly the UE's CSG list limited to cells within that specific LTE RAN for handling internal mobility, i.e. UE handovers to neighbor CSG cells not involving the CN.

Message 212 may be implemented for LTE as an INITIAL CONTEXT SETUP REQUEST message. This message is sent after a UE has connected to an eNB, in this case the HeNB 22. Whether or not to include the CSG whitelist/blacklist in the INITIAL CONTEXT SETUP REQUEST message may be conditioned on whether the UE is connecting to a Femto cell 22 either supported by a HeNB GW 24 or directly connected to the EPC. This message 212 could then be intercepted by the HeNB GW 24, which then stores the CSG whitelist/blacklist such as is shown at blocks 222 and 232. The HeNB GW 24 may also provide this list to the HeNB which stores it in its local memory at block 234.

Message 212 may be also implemented as a UE CONTEXT MODIFICATION REQUEST message, which is conventionally used whenever any information concerning the UE context needs to be modified. The UE CONTEXT MODIFICATION REQUEST message may also be used to implement message 220 for updating a change to the Allowed CSG list which the MME 26 receives for the case the update is relevant to the whitelist/blacklist that was previously sent via the INITIAL CONTEXT SETUP REQUEST message. Or if the CSG whitelist/blacklist is sent in isolation such as within the UE CONTEXT MODIFICATION REQUEST message only (without inclusion in the INITIAL CONTEXT SETUP REQUEST) immediately after the UE context has been established. The HeNB GW 24 can intercept this message 220 and store the CSG whitelist/blacklist in its local memory, and/or also forward it to the HeNB 22 for storage there.

The CSG whitelist/blacklist may also be included within the HANDOVER REQUEST message, which is useful when the UE is relocating from a eNB to a HeNB 22 since this is likely to be followed by an intra HeNB GW relocation (HeNB to HeNB) or by mobility from the HeNB 22 to another (or the same) eNB. The CSG whitelist/blacklist can be stored either at the HeNB GW 24 or at the HeNB 22 for those future access control procedures.

By the above examples it is clear that for the HNB GW/HeNB GW 24 and possibly also the HNB/HeNB 22 will be provided the relevant CSG information for access control at the source entity for enhanced mobility procedures not involving the core network.

One technical effect of the above exemplary embodiments of the invention is to allow enhanced mobility procedures which do not rely on the core network to perform access control, thereby reducing mobility signaling over the core network and improving mobility performance. This is true for different types of enhanced mobility, such as for example HNB to HNB, HeNB to HeNB, HNB to NB, and HeNB to eNB, and also including Iurh based enhanced-relocation in UTRAN without CN involvement and Iurh based soft-handoff scenarios in UTRAN for inter-CSG and intra-CSG types.

Figure 3:
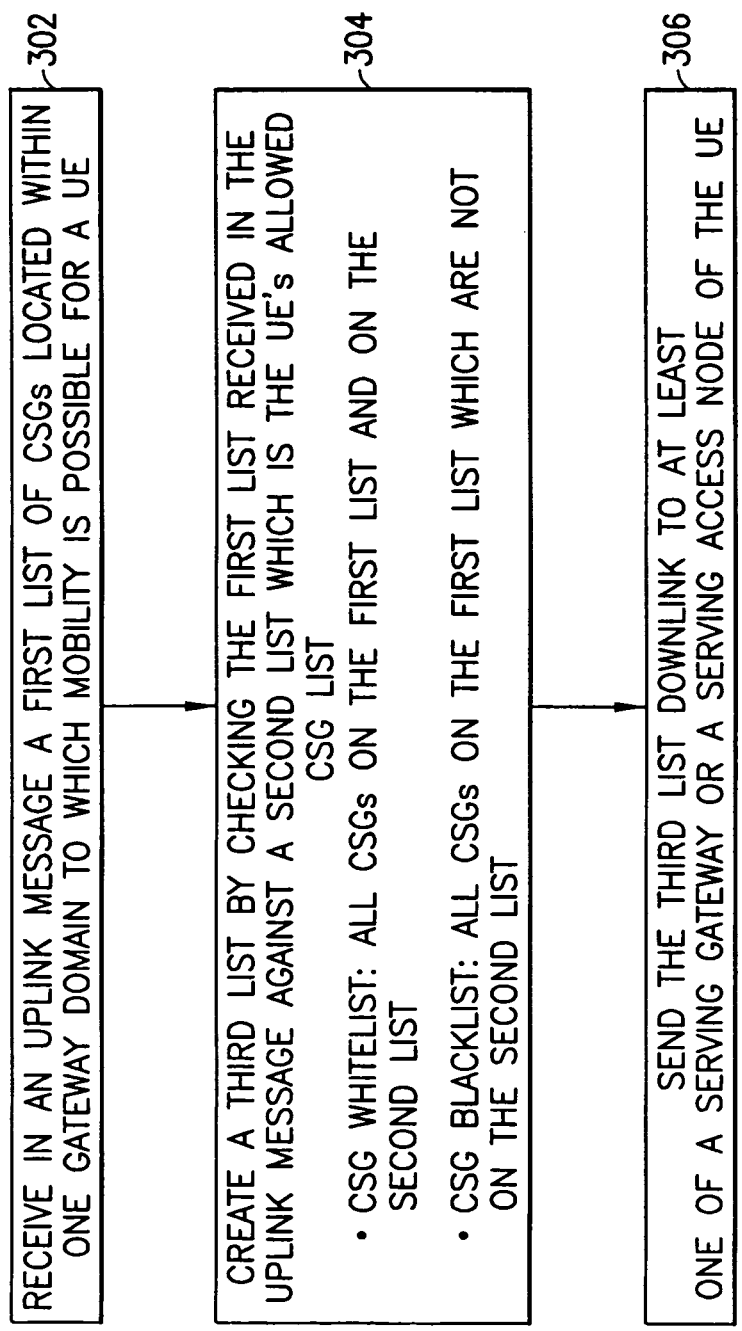
FIG. 3 is a logic flow diagram that illustrates the operation of a method, and a result of execution of computer program instructions embodied on a computer readable memory, in accordance with the exemplary embodiments of this invention.

FIG. 3 is a logic flow diagram that illustrates the operation of a method, and a result of execution of computer program instructions, in accordance with the exemplary embodiments of this invention from the perspective of the core network. The elements of FIG. 3 may be performed by one node in the CN such as the radio network controller or the mobility management entity as noted above, or they may be shared and performed by two or more CN nodes.

In accordance with these exemplary embodiments at block 302 the CN receives in an uplink message a first list of closed subscriber groups located within one gateway domain to which mobility is possible for a user equipment. In the examples above this first list was termed the CSG Mobility List at message 204 of FIG. 2, and may be the list of all CSGs within the HNB's/HeNB's gateway domain or simply neighbor CSG cells of the UE's serving HNB/HeNB which is a limited subset of all the CSGs in the gateway domain. This uplink message is received from one of a serving gateway or a serving access node of the UE.

At block 304 the CN then creates a third list by checking the first list received in the uplink message against a second list which is the UE's allowed closed subscriber group list. This third list is detailed above as the CSG whitelist or blacklist, and in effect is the first list filtered by the second list so that in the case of a CSG whitelist the third list consists of identifiers for those closed subscriber groups in the first list which are also in the second list. In the case of a CSG blacklist the third list are all those closed subscriber groups in the first list which are not in the second list.

At block 306 the CN then sends the third list downlink to at least one of a serving gateway or a serving access node of the UE. The above examples give numerous implementations of the uplink message of block 302 and the downlink message of block 306.

Further embodiments detailed herein have the additional elements of updating the CSG whitelist/blacklist by various messages.

The various blocks shown in FIG. 3 may be viewed as method steps, and/or as operations that result from operation of computer program code, and/or as a plurality of coupled logic circuit elements constructed to carry out the associated function(s).

Figure 4:
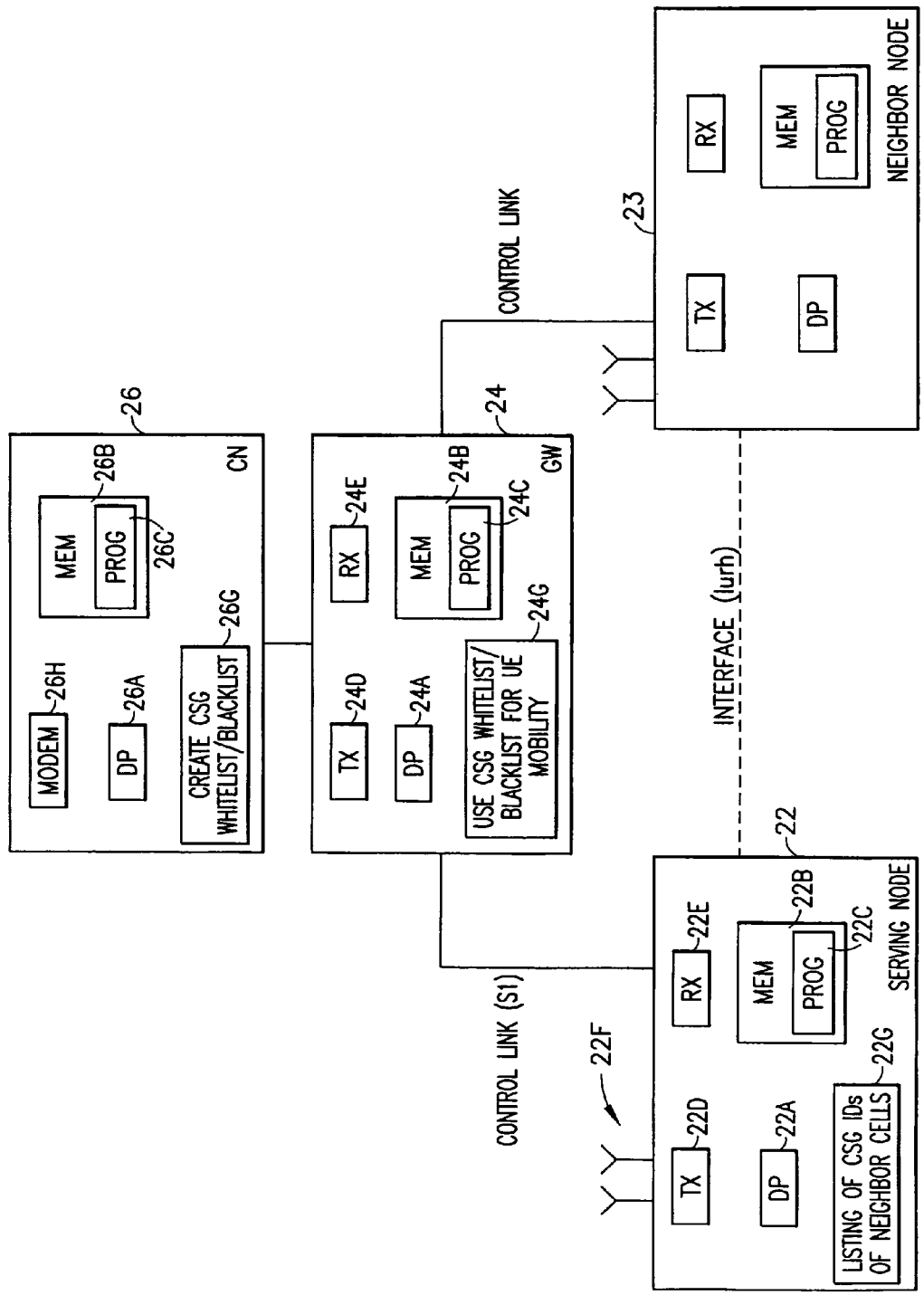
FIG. 4 is a simplified block diagram of various electronic devices that are suitable for use in practicing the exemplary embodiments of this invention.

Reference is now made to FIG. 4 for illustrating a simplified block diagram of various electronic devices and apparatus that are suitable for use in practicing the exemplary embodiments of this invention. In FIG. 4 a serving cell 22 is adapted for communication over a wireless link with a mobile apparatus, such as a mobile terminal or UE (not shown). The serving cell 22 may be implemented as a HNB or a HeNB as in the examples above, or as another type of private access node. The serving cell 22 may have a direct interface to the CN 26 as is possible in the LTE system, or it may interface to the CN 26 through a serving GW 24 such as a HNB GW/HeNB GW in the examples above.

The serving node 22 includes processing means such as at least one data processor (DP) 22A, storing means such as at least one computer-readable memory (MEM) 22B storing at least one computer program (PROG) 22C, and also communicating means such as a transmitter TX 22D and a receiver RX 22E for bidirectional wireless communications with the UE via one or more antennas 22F. Also shown for the serving node 22 at block 22G is the first list which include the CSG IDs of cells within the GW domain (or a subset of those which are the serving cell's CSG neighbor cells) and to which mobility by the UE is possible. This was described above as the CSG mobility list, and the serving cell has it stored in its memory for sending in the uplink message 204 detailed at FIG. 2.

For completeness there is shown one of several neighbor nodes 23 which includes its own processing means such as at least one data processor (DP), storing means such as at least one computer-readable memory (MEM) storing at least one computer program (PROG), and communicating means such as a transmitter TX and a receiver RX for bidirectional wireless communications with other UEs under its control via one or more antennas. In certain implementations the neighbor second node 23 may be embodied as a HNB or HeNB. For the HNB implementation there may be an Iurh interface directly between the serving node 22 and the neighbor node 23 as noted above.

Similarly, the serving GW 28 which may be implemented as a HNB GW or a HeNB GW includes processing means such as at least one data processor (DP) 24A, storing means such as at least one computer-readable memory (MEM) 24B storing at least one computer program (PROG) 24C, and communicating means such as a modem 24H for bidirectional communication with the serving node 22 via the control link and also with the neighbor node over the other control link. In an LTE embodiment these control links are implemented as S1 interfaces. While not particularly illustrated for the serving or neighbor nodes they also are assumed to include as part of their wireless communicating means a modem; for those devices it is assumed to be inbuilt with the TX and/or RX. The GW 24 has stored in its local memory at 24G the CSG whitelist or blacklist that is specific to the same UE as the CSG Mobility List sent uplink by the serving node 22, but this CSG whitelist/blacklist was received at the GW 24 from the CN 24. The GW 24 uses that CSG whitelist/blacklist for controlling mobility of the UE from the serving cell 22 without further assistance from the CN 26.

The CN 26 may be implemented as a radio network controller in the UTRAN system or as a S-GW/MME in the LTE system. It also includes processing means such as at least one data processor (DP) 26A, storing means such as at least one computer-readable memory (MEM) 26B storing at least one computer program (PROG) 26C, and communicating means such as a modem 26H for bidirectional communication with the GW 24 as well as with other CNs, registry servers holding the various UE contexts and Allowed CSG Lists and the like, as well as the Internet and publicly switched telephone networks. The CN 26 has stored in its local memory at 26G the CSG whitelist or blacklist noted above which is sent downlink to the GW 24, and also the CN 26 has stored in its memory the algorithm used to create that UE-specific CSG whitelist/blacklist.

At least one of the PROGs 26C in the CN 26 is assumed to include program instructions that, when executed by the associated DP 26A, enable the device to operate in accordance with the exemplary embodiments of this invention, as detailed above. The serving node 22 and the GW 24 also have software stored in their respective MEMs to implement certain aspects of these teachings as detailed above. In these regards the exemplary embodiments of this invention may be implemented at least in part by computer software stored on the MEM 26B, 24B, 22B which is executable by the DP 26A of the CN 26 and/or by the DP 24A/22A of the respective GW 24 and serving node 22, or by hardware, or by a combination of tangibly stored software and hardware (and tangibly stored firmware). Electronic devices implementing these aspects of the invention need not be the entire devices as depicted at FIG. 4, but exemplary embodiments may be implemented by one or more components of same such as the above described tangibly stored software, hardware, firmware, DP, or various combinations thereof.

Various embodiments of the computer readable MEMs 22B, 24B and 28B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 22A, 24A and 28A include but are not limited to general purpose computers, special purpose computers, microprocessors, digital signal processors (DSPs) and multi-core processors.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

While the exemplary embodiments have been described above in the context of the EUTRAN and LTE systems, it should be appreciated that the exemplary embodiments of this invention are not limited for use with only these two particular radio access technologies and these teachings may be used to advantage in other wireless communication systems which utilize private networks and access nodes.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   receiving in an uplink message a first list of closed subscriber groups located within one gateway domain to which mobility is possible for a user equipment;
   creating a new third list by checking the first list received in the uplink message against a second list which is the user equipment's allowed closed subscriber group list; and
   sending the new third list downlink to at least one of a serving gateway of the user equipment or a serving access node of the user equipment.

2. The method according to claim 1, in which the method is executed by a core network.

3. The method according to claim 1, in which the first list is a closed subscriber group mobility list.

4. The method according to claim 3, in which the first list consists of all closed subscriber groups within a domain of the respective serving gateway or serving access node.

5. The method according to claim 3, in which the first list consists of all neighbor closed subscriber group cells of the respective serving gateway or serving access node.

6. The method according to claim 1, in which the uplink message is received from the respective serving gateway or serving access node.

7. The method according to claim 1, in which the new third list consists of identifiers for all closed subscriber groups which are in the first list and also in the second list.

8. The method according to claim 1, in which the new third list consists of identifiers for all closed subscriber groups which are in the first list but not also in the second list.

9. An apparatus comprising:
   at least one processor; and
   at least one memory storing computer program code;
in which the at least one memory with the computer program code is configured with the at least one processor to cause the apparatus to perform actions comprising:
   receiving in an uplink message a first list of closed subscriber groups located within one gateway domain to which mobility is possible for a user equipment;
   creating a new third list by checking the first list received in the uplink message against a second list which is the user equipment's allowed closed subscriber group list; and
   sending the new third list downlink to at least one of a serving gateway of the user equipment or a serving access node of the user equipment.

10. The apparatus according to claim 9, in which the apparatus is a core network entity.

11. The apparatus according to claim 9, in which the first list is a closed subscriber group mobility list.

12. The apparatus according to claim 11, in which the first list consists of all closed subscriber groups within a domain of the respective serving gateway or serving access node.

13. The apparatus according to claim 11, in which the first list consists of all neighbor closed subscriber group cells of the respective serving gateway or serving access node.

14. The apparatus according to claim 9, in which the uplink message is received from the respective serving gateway or serving access node.

15. The apparatus according to claim 9, in which the new third list consists of identifiers for all closed subscriber groups which are in the first list and also in the second list.

16. The apparatus according to claim 9, in which the new third list consists of identifiers for all closed subscriber groups which are in the first list but not also in the second list.

17. A memory storing computer program code, which when executed by at least one processor result in actions comprising:
   receiving in an uplink message a first list of closed subscriber groups located within one gateway domain to which mobility is possible for a user equipment;
   creating a new third list by checking the first list received in the uplink message against a second list which is the user equipment's allowed closed subscriber group list; and
   sending the new third list downlink to at least one of a serving gateway of the user equipment or a serving access node of the user equipment.

18. The memory according to claim 17, in which the memory and the at least one processor are disposed within a core network.

19. The memory according to claim 17, in which the new third list consists of identifiers for all closed subscriber groups which are in the first list and also in the second list.

20. The memory according to claim 17, in which the new third list consists of identifiers for all closed subscriber groups which are in the first list but not also in the second list.

* * * * *